US009695325B2

United States Patent
Kohzuki et al.

(10) Patent No.: US 9,695,325 B2
(45) Date of Patent: Jul. 4, 2017

(54) ACTIVE ENERGY RAY CURABLE COMPOSITION, ACTIVE ENERGY RAY CURABLE INK, COMPOSITION STORED CONTAINER, TWO DIMENSIONAL OR THREE DIMENSIONAL IMAGE FORMING APPARATUS, IMAGE FORMING METHOD, CURED MATERIAL, AND PROCESSED PRODUCT

(71) Applicants: Shizuka Kohzuki, Kanagawa (JP); Teruki Kusahara, Shizuoka (JP); Hiroki Nakane, Kanagawa (JP)

(72) Inventors: Shizuka Kohzuki, Kanagawa (JP); Teruki Kusahara, Shizuoka (JP); Hiroki Nakane, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/853,141

(22) Filed: Sep. 14, 2015

(65) Prior Publication Data

US 2016/0075895 A1   Mar. 17, 2016

(30) Foreign Application Priority Data

Sep. 16, 2014 (JP) .................. 2014-187589
Jul. 13, 2015 (JP) .................. 2015-139551

(51) Int. Cl.
*C09D 11/10* (2014.01)
*C09D 11/101* (2014.01)
*C09D 11/322* (2014.01)

(52) U.S. Cl.
CPC ............ *C09D 11/10* (2013.01); *C09D 11/101* (2013.01); *C09D 11/322* (2013.01)

(58) Field of Classification Search
CPC ........ C09D 11/30; C09D 11/10; C09D 11/101; C09D 11/322
See application file for complete search history.

(56) References Cited

U.S. PATENT DOCUMENTS

2012/0196949 A1* 8/2012 Heo ................ C08G 63/21
522/63
2015/0009265 A1 1/2015 Kohzuki et al.
(Continued)

FOREIGN PATENT DOCUMENTS

JP   2009-299057   12/2009
JP   2011-122063    6/2011
(Continued)

OTHER PUBLICATIONS

Umebayashi, Machine Translation of JP 2014-172971 A aka App # 2013-045776, Mar. 2013.*
(Continued)

*Primary Examiner* — Geoffrey Mruk
*Assistant Examiner* — Scott A Richmond
(74) *Attorney, Agent, or Firm* — Oblon, McClelland, Maier & Neustadt, L.L.P.

(57) ABSTRACT

An active energy ray curable composition includes a non-polymerizable resin; and polymerizable compounds comprising a mono-functional monomer having a single polymerizable unsaturated ethylene double bond, wherein the following relations are satisfied: $\Delta Tg = |Tg_p - Tg_m| \geq 19$ degrees C., where $Tg_p$ represents a glass transition temperature of the non-polymerizable resin and $Tg_m$ represents a glass transition temperature of a homopolymer of the mono-functional monomer, $Tg_H \geq 10$ degrees C., where $Tg_H$ represents the higher of $Tg_p$ and $Tg_m$, and $Tg_L \leq 40$ degrees C., where $Tg_L$ represents the lower of $Tg_p$ and $Tg_m$.

17 Claims, 2 Drawing Sheets

(56) References Cited

U.S. PATENT DOCUMENTS

| | | |
|---|---|---|
| 2015/0077481 A1 | 3/2015 | Yoshino et al. |
| 2015/0130878 A1 | 5/2015 | Kohzuki et al. |
| 2015/0232675 A1 | 8/2015 | Yoshino et al. |
| 2015/0353751 A1* | 12/2015 | Umebayashi ........ C09D 11/101 428/207 |
| 2015/0361284 A1* | 12/2015 | Herlihy ................ C09D 11/101 522/18 |

FOREIGN PATENT DOCUMENTS

| | | | |
|---|---|---|---|
| JP | 2014172971 A | * | 3/2013 |
| JP | 2013-142151 | | 7/2013 |
| WO | WO2014123706 | * | 1/2014 |
| WO | WO2014136923 | * | 3/2014 |

OTHER PUBLICATIONS

Umebayashi, Machine Translation of WO 2014-136923 aka PCT/JP2014/055910, Mar. 2014.*
U.S. Appl. No. 14/858,658, filed Sep. 18, 2015, Kohzuki, et al.

* cited by examiner

ACTIVE ENERGY RAY CURABLE COMPOSITION, ACTIVE ENERGY RAY CURABLE INK, COMPOSITION STORED CONTAINER, TWO DIMENSIONAL OR THREE DIMENSIONAL IMAGE FORMING APPARATUS, IMAGE FORMING METHOD, CURED MATERIAL, AND PROCESSED PRODUCT

CROSS-REFERENCE TO RELATED APPLICATIONS

This patent application is based on and claims priority pursuant to 35 U.S.C. §119(a) to Japanese Patent Application Nos. 2014-187589 and 2015-139551, filed on Sep. 16, 2014 and Jul. 13, 2015, in the Japan Patent Office, the entire disclosures of which are hereby incorporated by reference herein.

BACKGROUND

Technical Field

The present invention relates to an active energy ray curable composition, an active energy ray curable ink, a composition stored container, a two dimensional or three dimensional image forming apparatus, an image forming method, a cured material, and a processed product Background Art Photopolymerizable inks are conventionally used or supplied for offset, silk screen, top coating agents, etc. and become popular due to its cost reduction by simplifying drying processes and advantages such as less volatile amounts of solvents, which is good for protection of the environment.

Of these, aqueous-based and solvent-based inkjet inks are most commonly and selectively used to particular applications. However, aqueous-based and solvent-based inkjet inks involve drawbacks such that the variety of substrates (materials to which ink is applied, recording medium, etc.) for industrial use is limited, such inks have relatively poor water resistance and large drying energy, and the ink components are attached to a head as they dry. Therefore, replacement of the aqueous-based and solvent-based inkjet inks with photopolymerizable inks having relatively low volatility is researched and studied.

With regard to the photopolymerizable inkjet ink, after the photopolymerizable inkjet ink is applied to a substrate, post-processing to the recorded matter is increasingly required.

Cured materials of typical photopolymerizable inkjet inks are hard but brittle in most cases. Therefore, mono-functional monomers are added to the ink to secure extensibility required for such processing. However, simply adding such monomers is not sufficient to obtain a cured material having a desired hardness. In addition, if a polymerizable multi-functional monomer is used to maintain hardness of a cured material, extensibility deteriorates. That is, there is trade-off between hardness and extensibility.

In addition, in attempts to obtain a hard cured material, a mercury light or an irradiator to emit a low energy ray such as an ultraviolet laser beam as a device is used to cure a photopolymerizable inkjet ink. However, these are also not sufficient to improve hardness.

SUMMARY

According to the present invention, provided is an improved active energy ray curable composition including a non-polymerizable resin and polymerizable compounds including a mono-functional monomer having a single polymerizable unsaturated ethylene double bond, wherein the following relations are satisfied:

$$\Delta Tg = |Tg_p - Tg_m| \geq 19 \text{ degrees C.}$$

where $Tg_p$ represents the glass transition temperature of the non-polymerizable resin and $Tg_m$ represents the glass transition temperature of a homopolymer of the mono-functional monomer, $$Tg_H \geq 10 \text{ degrees C.,}$$

where $Tg_H$ represents the higher of $Tg_p$ and $Tg_m$, and $$Tg_L \leq 40 \text{ degrees C.,}$$

where $Tg_L$ represents the lower of $Tg_p$ and $Tg_m$.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
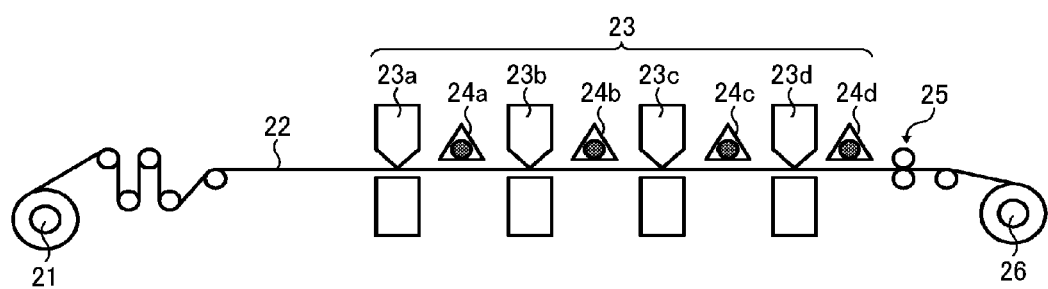
FIG. 1 is a schematic diagram illustrating an example of a two dimensional image forming apparatus according to an embodiment of the present invention.

The present invention provides an active energy ray curable composition by which a cured material is obtained striking a balance between high hardness and extensibility while maintaining bending property.

The present disclosure will be described below in detail with reference to several embodiments and accompanying drawings.

The active energy ray curable composition of the present disclosure includes a non-polymerizable resin and polymerizable compounds including a mono-functional monomer having a polymerizable unsaturated ethylene double bond, wherein the following relations are satisfied:

$$\Delta Tg = |Tg_p - Tg_m| \geq 19 \text{ degrees C.,}$$

where $Tg_p$ represents the glass transition temperature of the non-polymerizable resin and $Tg_m$ represents the glass transition temperature of the homopolymer of the mono-functional monomer, $$Tg_H \geq 10 \text{ degrees C.,}$$

where $Tg_H$ represents the higher of $Tg_p$ and $Tg_m$, and $$Tg_L \leq 40 \text{ degrees C.,}$$

where $Tg_L$ represents the lower of $Tg_p$ and $Tg_m$.

In the present disclosure, the mono-functional monomer represents a monomer having a single polymerizable unsaturated ethylene double bond.

Specific examples thereof include, but are not limited to, the following monomers: phenoxyethyl acrylate, tetrahydrofurfuryl acrylate, isoboronyl acrylate, 2-hydroxyethyl acrylate, 4-hydroxybutyl acrylate, isobutyl acrylate, t-butyl acrylate, isooctyl acrylate, 2-methoxyethyl acrylate, methoxytriethyleneglycol acrylate, 2-ethoxylethyl acrylate, 3-methoxybutyl acrylate, ethoxyethyl acrylate, buthoxyethyl acrylate, ethoxydiethyleneglycol acrylate, ethoxydiethyleneglycol acrylate, methoxydiethylethyl acrylate, ethyldiglycol acrylate, cyclic trimethyl propane formal monoacrylate, imide acrylate, isoamyl acrylate, ethoxified succinic acid acrylate, trifluoroethyl acrylate, omega-carboxylpolycaprolactone monoacrylate, N-vinylformamide, cyclohexyl acrylate, benzyl acrylate, methylphenoxyethyl acrylate, 4-t-butyl cyclohexyl acrylate, caprolactone-modified tetrahydrofurfuryl acrylate, tribromophenyl acrylate, ethoxified tribromophenyl acrylate, 2-phenoxyethyl acrylate, acryloyl morpholine, phenoxydiethylene glycol acrylate, vinylcaprolactam, vinylpyrrolidone, 2-hydroxy-3-phenoxypropyl acrylate, 1,4-cyclohexane dimethanol monoacrylate, 2-(2-ethoxy)ethyl acrylate, stearyl acrylate, diethylene glycolmonobutylether acrylate, lauryl acrylate, isodecyl acrylate, 3,3-5-trimethylcyclohexane acrylate, isooctyl acrylate, octyl/decyl acrylate, tridecyl acrylate, caprolactone acryl ate, ethoxified (4) nonylphenol acrylate, methoxypolyethylene glycol (350) monoacrylate, and methoxypolyethylene glycol (550) monoacrylate. These compounds are selectively used depending on the difference between $Tg_m$ of the homopolymer and the $Tg_p$ of the non-polymerizable resin.

The mono-functional monomer having a single polymerizable unsaturated ethylene double bond accounts for 50 percent by mass to 100 percent by mass of the total content of the polymerizable compounds in the active energy ray curable composition. It is more preferably from 60 percent by mass to 100% by mass and more preferably from 80% by mass to 100% by mass.

In the present disclosure, non-polymerizable resin having no polymerizable unsaturated ethylene double bond is used as the resin. Examples thereof are the following: Acrylic-based resin, epoxy-based resins, ketone-based resins, nitrocellulose-based resins, phenoxy-based resins, polyester-based resins, polyurethane-based resins, and polyvinyl chloride(PVC)-based resins, and polymers selected from mixtures thereof.

Specific examples of the acrylic-based resins include, but are not limited to, JONCRYL® (manufactured by BASF Japan), S-LEC P (manufactured by SEKISUI CHEMICAL CO., LTD.), and Elvacite 4026 and Elvacite 2028 (manufactured by Lucite International, INC). Specific examples of the polyester-based resins include, but are not limited to, ELITEL® (manufactured by UNITIKA LTD.) and VYLON (manufactured by TOYOBO CO., LTD.), Polyester MSP-640 (manufactured by Nippon Synthetic Chemical Industry Co., Ltd.). Specific examples of the polyurethane-based resins include, but are not limited to, VYLON UR (manufactured by TOYOBO CO., LTD.), NT-HI LAMIC (manufactured by Dainichiseika Color and Chemicals Mfg. Co., LTD.), CRISVON (manufactured by DIC Corporation), and NIPPOLLAN (manufactured by NIPPON POLYURETHANE INDUSTRY CO. LTD.). Specific examples of the PVC-based resins include, but are not limited to, SOLBIN and Vinyblan (manufactured by Nisshin Chemical Co., Ltd.), Sara Latex (manufactured by Asahi Kasei Chemicals Corporation), SUMIELITE™ (manufactured by Sumitomo Chemical Co., Ltd.), Sekisui PVC (manufactured by SEKISUI CHEMICAL CO., LTD.), and UCAR (manufactured by The Dow Chemical Company). Specific examples of the ketone-based resins include, but are not limited to, Hilac (manufactured by Hitachi Chemical Co., Ltd.) and SK (manufactured by Degusa), Specific examples of the epoxy-based resins include, but are not limited to, EPPN-201 (manufactured by Nippon Kayaku Co., Ltd.) and HP-7200 (manufactured by DIC Corporation). Specific examples of the nitrocellulose-based resins include, but are not limited to, HIG, LIG, SL, and VX (manufactured by Asahi Kasei Chemicals Corporation), nitrocellulose for industrial use RS and SS (manufactured by Daicel Corporation). Specific examples of the phenoxy-based resins include, but are not limited to, YP-50 and YP-50S (manufactured by NIPPON STEEL & SUMIKIN CHEMICAL CO., LTD.).

The weight average molecular weight Mw of the non-polymerizable resin is preferably from 1,500 to 70,000. The molecular weight is preferably 2,000 or more and more preferably 3,000 or more, preferably 30,000 or less, and more preferably 20,000 or less. The weight average molecular weight Mw can be measured by known technologies, for example, gel permeation chromatography (GPC).

The content of the non-polymerizable resin preferably accounts for 0.1 percent by mass to 5 percent by mass and more preferably 0.1 percent by mass to 3 percent by mass of the total content of the polymerizable compounds (100 percent by mass).

In general, as the molecular weight or the content of a resin increases, the viscosity thereof tends to increase. For this reason, the content that can be added to a composition decreases. Therefore, the balance between the content of a resin added to the composition and the molecular weight of the resin is appropriately determined considering jetting (discharging) characteristics.

In the present disclosure, the following relation is satisfied:

$$\Delta Tg = |Tg_p - Tg_m| \geq 19 \text{ degrees C.},$$

where $Tg_p$ represents a glass transition temperature of the non-polymerizable resin and $Tg_m$ represents a glass transition temperature of the homopolymer of the mono-functional monomer having a polymerizable unsaturated ethylene double bond. This means, both a material having a high Tg and a material having a low Tg are used to strike a balance between hardness and flexibility of an obtained cured material.

In addition, in the present disclosure, the following relations are satisfied:

$$Tg_H \geq 10 \text{ degrees C.},$$

where $Tg_H$ represents the higher of $Tg_p$ and $Tg_m$, and $$Tg_L \leq 40 \text{ degrees C.},$$

where $Tg_L$ represents the lower of $Tg_p$ and $Tg_m$.

When the $Tg_H$ is lower than 10 degrees C., an obtained cured material is soft (low hardness). For this reason, for example, the material can be easily scratched by nail when a film is formed thereon.

When the $Tg_L$ surpasses 40 degrees C., shock resistance and bending property of an obtained cured material are inferior and not suitable for practical use.

$Tg_H$ is preferably not lower than 14 degrees C. and more preferably not lower than 20 degrees C. $Tg_L$ is preferably not higher than 20 degrees C., more preferably not higher than 10 degrees C., and furthermore preferably not higher than 0 degrees C.

Moreover, the active energy ray curable composition furthermore preferably satisfies the following relations: $Tg_p \geq 10$ degrees C. and $Tg_m \leq 40$ degrees. More preferably, $Tg_p$ is not lower than 10 degrees C. and $Tg_m$ is not higher than 20 degrees C.

The glass transition temperature $Tg_p$ of the non-polymerizable resin is easily controlled when designing the resin. Also, since mono-functional monomers having a high glass transition temperature $Tg_m$ are few, monomers having a $Tg_p$ higher than $Tg_m$ have wider ranges of selections, thereby increasing the freedom of formulation.

When two or more kinds of the non-polymerizable resins and two or more kinds of the monofunctional monomers having a polymerizable unsaturated ethylene double bond are used, the glass transition temperatures $Tg_p$ and $Tg_m$ are calculated according to the mass ratio of each resin to the total content of the non-polymerizable resins or the mass ratio of each mono-functional monomer to the total content of the monofunctional monomers.

For example, when a resin 1 and a resin 2 are used as the non-polymerizable resin, the glass transition temperature $Tg_p$ of the non-polymerizable resins is calculated by the following relation.

$$Tg_p = (Tg_{p1} \times \text{content of resin 1/total content of resins}) + (Tg_{p2} \times \text{content of resin 2/total content of resins}),$$

where $Tg_{p1}$ represents the glass transition temperature of the resin 1 and $Tg_{p2}$ represents the glass transition temperature of the resin 2.

For example, when a mono-functional monomer 1 and a mono-functional monomer 2 are used as the mono-functional monomer, the glass transition temperature $Tg_m$ of the homopolymer of the mono-functional monomer is calculated by the following relation.

$$Tg_m = (Tg_{m1} \times \text{content of mono-functional monomer 1/total content of mono-functional monomers}) + (Tg_{m2} \times \text{content of mono-functional monomer 2/total content of mono-functional monomers}),$$

where $Tg_{m1}$ represents the glass transition temperature of homopolymer of the mono-functional monomer 1 and $Tg_{p2}$ represents the glass transition temperature of the homopolymer of the mono-functional monomer 2.

The active energy ray curable composition of the present disclosure optionally contains a multi-functional monomer having two or more polymerizable unsaturated ethylene double bonds in an amount of 15% by mass or less to the total amount of the polymerizable compound.

Specific examples of the multi-functional monomer include, but are not limited to the following: hexadiol diacrylate, trimethylol propane triacrylate, pentaerythritol triacrylate, polyethyleneglycol diacrylate, dipropyleneglycol diacrylate, tripropyleneglycol triacrylate, neopentylglycol diacrylate, bispentaerythritol hexaacrylate, ethylene glycol diacrylate, diethylene glycol diacrylate, 1,6-hexane diol diacrylate, ethoxylated 1,6-hexanediol diacrylate, polypropylene glycol diacrylate, 1,4-butanediol diacrylate, 1,9-nonanediol diacrylate, tetraethylene glycol diacrylate, 2-n-butyl-2-ethyl 1,3-propane diol diacrylate, hydroxy pivalic acid neopentyl glycol diacrylate, 1,3-butylene glycol di(meth)acrylate, trimethylol propane triacrylate, hydroxy pivalic acid trimethylol propane triacrylate, ethoxylated phosphoric acid triacrylate, ethoxylated tripropylene glycol diacrylate, neopentyl glycol-modified trimethylol propane diacrylate, stearyl acid-modified pentaerythritol diacrylate, pentaerythritol triacrylate, tetramethylol propane triacrylate, tetramethylol methane triacrylate, pentaerithritol tetraacrylate, caprolacone-modified trimethylo propane triacrylate, propoxylate glyceryl triacrylate, tetramethylol methanetetraacrylate, pentaerithritol tetraacrylate, ditrimethylol propane tetraacrylate, ethoxylated pentaerythritol tetraacrylate, dipentaerythritol hexaaxrylate, caprolacotone-modified dipentaerythritol hexaacrylate, dipentaerythritol hydroxy pentaacrylate, neopentylglycol oligoacrylate, 1,4-butanediol oligoacrylate, 1,6-hexanediol oligoacrylate, trimethylolpropane oligoacrylate, pentaerythritol oligoacrylate, ethoxylated neopentylglycol di(meth)acrylate, propoxylated neopentylglycol di(meth)acrylate, tripropylene glycol di(meth)acrylate, ethoxylated trimethylol propanetriacrylate, and propoxylated trimethylol propane triacrylate.

These multi-functional monomers can be used alone or in combination.

Good curability is obtained by mixing with the multi-functional monomers.

Furthermore, when a high level of extensible processibility is required, bifunctional monomers are preferably used as the multi-functional monomer. Using only bifunctional monomers as the multi-functional monomer is more preferable.

When the mixing amount of the multi-functional monomer is 15 percent by mass or less to the total amount of the polymerizable compounds, more preferable cured film is formed. It is preferably 10 percent by mass or less and more preferably 5% by mass or less. When the content of the multi-functional monomer is 15 percent by mass or less, more preferable extensibility is obtained.

The active energy ray curable composition of the present disclosure may contain oligomers having a polymerizable unsaturated ethylene double bond(s) in an amount of 10% by mass or less to the total amount of the polymerizable compound.

The oligomer for use in the present disclosure includes a polymerizable unsaturated ethylene double bond and specific examples thereof include, but are not limited to, aromatic urethane oligomers, aliphatic urethane oligomers, epoxyacrylate oligomers, polyesteracrylate oligomers, and other special oligomers.

Specific examples thereof available on market include, but are not limited to the following: UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B,UV-6300B, UV-6640B, UV-7550B, UV-7600B, UV-7605B, UV-7610B, UV-7630B, UV-7640B, UV-7650B, UT-5449, and UT-5454 (all manufactured by The Nippon Synthetic Chemical Industry Co., Ltd., CN902, CN902J75, CN929, CN940, CN944, CN944B85, CN959, CN961E75, CN961H81, CN962, CN963, CN963A80, CN963B80, CN963E75, CN963E80, CN963J85, CN964, CN965, CN965A80, CN966, CN966A80, CN966B85, CN966H90, CN966J75, CN968, CN969, CN970, CN970A60, CN970E60, CN971, CN971A80, CN971J75, CN972, CN973, CN973A80, CN973H85, CN973J75, CN975, CN977, CN977C70, CN978, CN980, CN981, CN981A75, CN981B88, CN982, CN982A75, CN982B88, CN982E75, CN983, CN984, CN985, CN985B88, CN986, CN989, CN991, CN992, CN994, CN996, CN997, CN999, CN9001, CN9002, CN9004, CN9005, CN9006, CN9007, CN9008, CN9009, CN9010, CN9011, CN9013, CN9018, CN9019, CN9024, CN9025, CN9026, CN9028, CN9029, CN9030, CN9060, CN9165, CN9167, CN9178, CN9290, CN9782, CN9783, CN9788, and CN9893 (all manufactured by Sartomer Company), and EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 (all manufactured by Daicel-Cytec Company Ltd.). These can be used alone or in combination.

When the mixing amount of the oligomer is 10 percent by mass or less to the total amount of the polymerizable compounds, extensibility and curability are improved, thereby to form more preferable cured film. It is preferably 8 percent by mass or less. It is more preferably 5% by mass or less. When the content of the oligomer is 10 percent by mass or less, more preferable extensibility is obtained.

The oligomers preferably have two to five unsaturated carbon-carbon bonds and most preferably two bonds. When the oligomer has two bonds, good extensibility is obtained.

Polymerization initiators are preferably used for the curable composition of the present disclosure. The polymerization initiator produces active species such as a radical or a cation upon application of energy of an active energy ray and initiates polymerization of a polymerizable compound (monomer or oligomer). Of these, radical polymerization initiators are preferable.

A polymerization initiator that is inexpensive and generates no strong acid can be used for the active energy ray curable composition of the present disclosure. Therefore, it is possible to produce the curable composition at low cost and also it is easy to choose members for a printer. When using an extremely high energy light source such as electron beams, α ray, β ray, γ ray, or X ray, polymerization reaction proceeds without a polymerization initiator. This is a conventionally known matter and is not described in the present disclosure in detail.

In addition, the content of the polymerization initiator is not particularly limited but it is preferably from one percent by mass to 20 percent by mass and more preferably from 5 percent by mass to 15 percent by mass to the total content of the polymerizable compounds.

The radical polymerization initiator include, but are not limited to, a self-cleaving type and a hydrogen-abstraction type. Specific examples of the self-cleaving type include, but are not limited to, 2,2-dimethoxy-1,2-diphenylethane-1-one, 1-hydroxy cyclohexylphenyl ketone, 2-hydroxy-2-methyl-1-phenyl propane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]-phenyl}-2-methyl-1-propane-1-one, oligo[2-hydroxy-2-methyl-1-[4-(1-methylvinyl)phenyl]propanone, phenyl glyoxyic acid methyl ester, 2-methyl-1-[4-(methylthio)phenyl]-2-morpholino propane-1-one, 2-benzyl-2-dimethylamino-1-(4-morpholinophenyl)-butanone-1,2-dimethylamino-2-(4-methyl-benzyl)-1-(4-morpholino-4-yl-phenyl)butane-1-one, bis(2,4,6-trimethylbenzoyl)-phenyl phosphine oxide,bis(2,6-dimethoxybenzoyl)-2,4,4-trimethyl-pentyl phosphine oxide, 2,4,6-trimethyl benzoyl-phosphine oxide, 1,2-octane dione-[4-(phenylthio)-2-(o-benzoyloxime],ethanone-1-[9-ethyl-6-(2-methyl benzoyl)-9H-carbazole-3-yl]-1-(o-acetyloxime)]}, and [4-(methylphenylthio)phenyl]phenyl methanone.

Specific examples of the hydrogen-abstraction type include, but are not limited to, benzophenone-based compounds such as benzophenone, methylbenzophenone, methyl-2-benzoylbenzoate, 4-benzoyl-4'-methyldiphenyl sulfide and phenylbenzophenone; and thioxanthone-based compounds such as 2,4-diethylthioxanthone, 2-chlorothioxanthone, isopropylthioxanthone, and 1-chloro-4-propylthioxanthone.

Amine compounds can be used in combination as an polymerization accelerator.

Specific examples thereof include, but are not limited to, p-dimethylamino ethylbenzoate, p-dimethylamino-2-ethylhexylbenzoate, p-dimethylamino methylbenzoate, 2-dimethylaminoethyl benzoate, and p-dimethyl butoxyethylaminobenzoate.

With regard to the monomer component of the active energy ray curable composition of the present disclosure, the compounds thereof are determined by utilizing gaschromatography mass spectrometry (GC/MS) and the Tg of the homopolymer thereof can be measured by the differential scanning calorimetry (DSC). With regard to the polymer component, an ink is extracted by a poor solvent of the polymer, just the polymer composition is extracted and the Tg of the polymer can be similarly measured by DSC. Therefore, the active energy ray curable composition of the present disclosure can be identified.

Active Energy Ray

Active energy rays for use in curing an active energy ray curable composition of the present disclosure are not particularly limited, for example, they are preferred when they can impart energy to conduct polymerization reaction of polymerizable components in the curable composition.

Specific examples thereof include, but are not limited to, electron beams, α ray, β ray, γ ray, and X ray, in addition to ultraviolet rays. Preferably, in another embodiment, a particularly high energy light source obviates the need for a polymerization initiator to proceed reaction. In addition, in the case of irradiation with ultraviolet ray, mercury-free is strongly preferred in terms of protection of environment. Therefore, replacement with GaN-based ultraviolet light-emitting devices is preferred from industrial and environmental point of view. Furthermore, ultraviolet light-emitting diode (UV-LED) and ultraviolet laser diode (UV-LD) are preferable. Small size, long working life, high efficiency, and high cost performance make such irradiation sources desirable.

Colorant

The active energy ray curable composition of the present disclosure optionally contains a colorant. As the colorant, although depending on the objectives and requisites of the composition of the present disclosure, various pigments and dyes are suitable, which impart black, white, magenta, cyan, yellow, green, orange, and gloss color such as gold and silver. The content of the colorant is not particularly limited and may be determined considering the desired color density and dispersibility of the colorant in the curable composition, etc. It is preferred that the content of the colorant accounts for 0.1 percent by mass to 20 percent by mass of the total content (100 percent by mass) of the composition. Incidentally, the active energy ray curable composition of the present disclosure does not necessarily contain a colorant but can be clear and colorless. If no colorant is present in the composition, the composition is suitable as an overcoat layer for protecting an image The pigment can be inorganic or organic and a combination thereof.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, chelate azo pigments, etc.), polycyclic pigments such as phthalocyanine pigments, perylene pigments, perinone pigments, anthraquinone pigments, quinacridone pigments, dioxane pigments, thioindigo pigments, isoindolinone pigments, and quinofuranone pigments, nitro pigments, nitroso pigments, aniline black, and daylight fluorescent pigments.

In addition, a dispersant is optionally added to enhance the dispersibility of a pigment. The dispersant has no particular limit and can be, for example, polymer dispersants conventionally used to prepare a pigment dispersion material.

The dyes is not particularly limited and include, for example, acidic dyes, direct dyes, reactive dyes, basic dyes, and combinations thereof.

Organic Solvent

The active energy ray curable composition of the present disclosure optionally contains an organic solvent although it is preferable to spare it. The curable composition free of an organic solvent, in particular volatile organic compound (VOC) is preferable because it enhances safety at where the composition is handled and makes it possible to prevent pollution of the environment. Incidentally, the organic solvent represents a conventional non-reactive organic solvent, for example, ether, ketone, xylene, ethylacetate, cyclohexanone, and toluene, which is clearly distinguished from reactive monomers. Furthermore, "free of" an organic solvent means that no organic solvent is substantially contained. The content thereof is preferably less than 0.1 percent by mass.

Preparation of Active Energy Ray Curable Composition

The active energy ray curable composition of the present disclosure can be prepared by using the components described above. The preparation devices and conditions are not particularly limited.

For example, the curable composition can be prepared by charging a polymerizable monomer, a pigment, a dispersant, etc., into a dispersing machine such as a ball mill, kitty mill, a disk mill, a pin mill, and a DYNO-MILL to prepare a pigment liquid dispersion followed by mixing with a polymerizable monomer, an initiator, a polymerization inhibitor, and a surfactant.

Viscosity

The viscosity of the active energy ray curable composition of the present disclosure has no particular limit because it can be adjusted depending on the purpose and application devices. For example, if a discharging device that discharges the composition from nozzles is employed, the viscosity thereof is preferably in the range of from 3 mPa·s to 40 mPa·s, more preferably from 5 mPa·s to 15 mPa·s, and particularly preferably from 6 mPa·s to 12 mPa·s in the temperature range of from 20 degrees C. to 65 degrees C., preferably at 25 degrees C. In addition, it is particularly preferable to satisfy this viscosity range by a composition free of the organic solvent mentioned above. The viscosity can be measured with a cone-and-plate rotary viscometer VISCOMETER TVE-22L manufactured by Toki Sangyo Co., using a cone rotor (1°34'×R24), at a rotation speed of 50 rpm, with the temperature of hemathermal circulating water appropriately set in a range of from 20 degrees C. to 65 degrees C. VISCOMATE VM-150III can be used for the temperature adjustment of the circulating water.

Application Field

The application field of the active energy ray curable composition of the present disclosure is not particularly limited. It can be applied to any field where the active energy ray curable composition is used. For example, the curable composition is selected to a particular application and used for a resin for processing, a paint, an adhesive, an insulant, a release agent, a coating material, a sealing material, various resists, and various optical materials.

Figure 2:
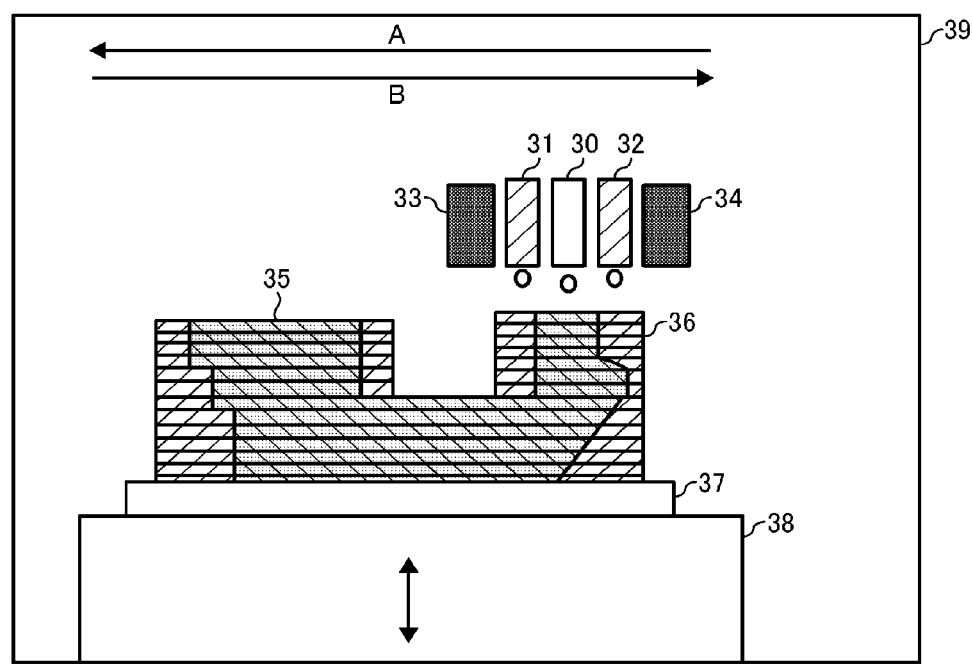
FIG. 2 is a schematic diagram illustrating an example of the three dimensional image forming apparatus according to an embodiment of the present invention.
Figure 3A:
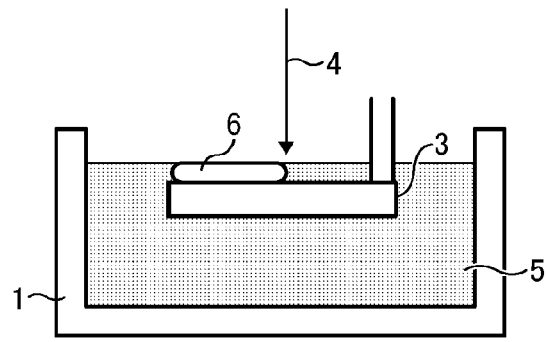
FIGS. 3A, 3B, 3C, and 3D are schematic diagrams illustrating another example of the three dimensional image forming apparatus according to an embodiment of the present invention.
Figure 3B:
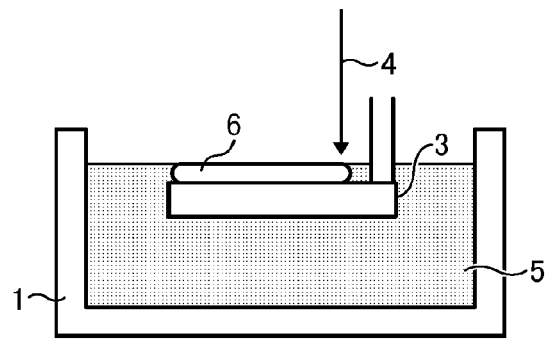
Figure 3C:
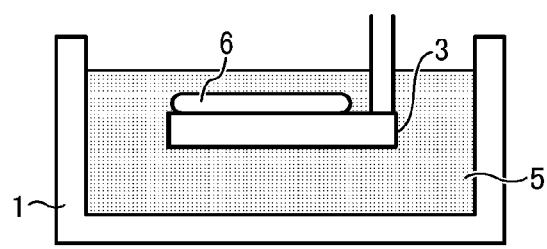
Figure 3D:
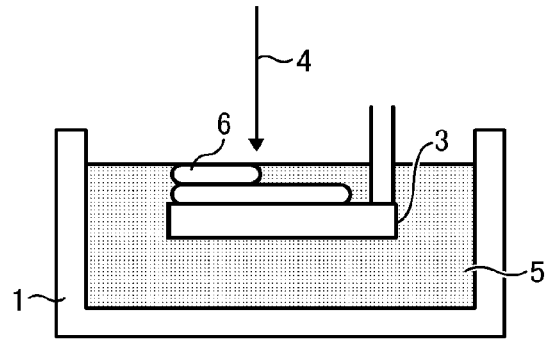

Furthermore, the active energy ray curable composition of the present disclosure can be used as an ink to form two-dimensional texts, images, and designed coating film on various substrates and in addition as a solid object forming material to form a three-dimensional solid object (additive manufacturing). This material for a three-dimensional object can be used as a binder for powder particles for use in powder additive manufacturing to form a solid object by repeating curing and laminating powder layers. Also, it can be used as a three-dimensional object constituting material (model material) or supporting member (supporting material) for use in additive manufacturing as illustrated in FIG. 2, FIG. 3A, FIG. 3B, FIG. 3C, and 3D. FIG. 2 is a diagram illustrating a method of additive manufacturing to sequentially form layers of the active energy ray curable composition of the present disclosure one on top of the other by repeating discharging, curing, and laminating the curable composition. FIGS. 3A to 3D are diagrams illustrating a method of additive manufacturing to sequentially form cured layers 6 one on top of the other having respective predetermined forms on a movable stage 3 by irradiating with the active energy ray 4 a storing pool (storing part) 1 of the active energy ray curable composition 5 of the present disclosure.

An apparatus configured to fabricate a three-dimensional object by the active energy ray curable composition of the present disclosure can be a known apparatus with no particular limit. For example, an apparatus is suitable which includes an accommodating device, a supplying device, and a discharging device of the curable composition, and an active energy ray irradiator.

In addition, the present disclosure includes cured materials obtained by curing the active energy ray curable composition and structures formed of the cured materials and a substrate on which the cured materials are formed. The structure can be processed to obtain a molded product. The processed product is fabricated by, for example, forming processing such as heating drawing and punching of cured materials and structures having a sheet-like form or film-like form.

These are suitably used for, for example, gauges or operation panels of vehicles, office machines, electric and electronic machines, and cameras, which requires processing the surface after decorating.

The substrate is not particularly limited. It can suitably be selected to a particular application. Specific examples thereof include, but are not limited to, paper, fiber, fabrics, leather, metal, plastic, glass, wood, ceramic, or composite materials thereof. Of these, plastic substrates are preferred in terms of processibility.

Composition Stored Container

The composition stored container of the present disclosure contains the active energy ray curable composition and is suitable for the application fields as described above. For example, if the active energy ray curable composition of the present disclosure is for ink, a container accommodating the ink can be used as in a form of an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed for any particular purpose and usage. It is preferable to use a light blocking material to block the light or cover a container with a light blocking sheet, etc.

Image Forming Method and Image Forming Apparatus

The image forming method of the present disclosure includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the active energy ray curable composition of the present disclosure. The storing part may include the container mentioned above. Furthermore, the method and the apparatus optionally include a discharging step and a discharging device to discharge the active energy ray curable composition, respectively. The method of discharging the curable composition is not particularly limited, and examples thereof include a continuous spraying method and an on-demand method. The on-demand method includes a piezo method, a thermal method, an electrostatic method, etc.

FIG. 1 is a diagram illustrating an image forming apparatus equipped with an inkjet discharging device. Printing units 23a, 23b, 23c, and 23d having ink cartridges and discharging heads for yellow, magenta, cyan, and black active energy ray curable inks, respectively discharge the inks onto a recording medium 22 fed from a supplying roller 21. Thereafter, light sources 24a, 24b, 24c, and 24d emit active energy rays to cure the inks to form a color image. Thereafter, the recording medium 22 is transferred (conveyed) to a processing unit 25 and a printed matter reeling roll 26. Each of the printing unit 23a, 23b, 23c and 23d optionally has a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method can be any of a serial method of discharging an ink onto a recording medium that is intermittently moving to the width of a discharging head by moving the head or a line method of discharging an ink onto a recording medium that is moving continuously from a discharging head held at a fixed position.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration or a two-side printing configuration.

Optionally, multiple colors can be printed with no or faint active energy ray from the light sources 24a, 24b, and 24c followed by irradiation of the active energy ray from the light source 24d. As a result, energy and cost can be saved.

The recorded matter on which images are printed with the ink of the present disclosure includes articles having images or texts on a plain surface of conventional paper, resin film, etc. a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a 3D object) of the present disclosure. An image forming apparatus 39 illustrated in FIG. 2 sequentially forms layers one on top of the other using a head unit having inkjet heads arranged movable in the directions indicated by the arrows A and B while discharging a first active energy ray curable composition from a discharging head unit 30 for additive manufacturing and a second active energy ray curable composition composed of different ingredients from the first active energy ray curable composition from discharging head units 31 and 32 for support and curing these compositions by ultraviolet irradiators 33 and 34 adjacent to the discharging head units 31 and 32. To be more specific, for example, after the discharging head units 31 and 32 for support discharge the second active energy ray curable composition onto a substrate 37 for additive manufacturing and the second active energy ray curable composition is solidified by irradiation of an active energy ray to form a first substrate layer having a hollow space for fabrication, the discharging head unit 30 for additive manufacturing discharges the first active energy ray curable composition onto the hollow space followed by irradiation of an active energy ray for solidification, thereby to form a first additive manufacturing layer. This step is repeated multiple times lowering the stage 38 movable in the vertical direction to laminate the support layer and the additive manufacturing layer to fabricate a solid object 35. Thereafter, an additive manufacturing support 36 is removed, if desired. Although only a single discharging head unit 30 for additive manufacturing is provided to the image forming apparatus illustrated in FIG. 2, it can have two or more discharging head units 30.

The present invention relates to the active energy ray curable composition and include the following embodiments 2 to 14.

1. An active energy ray curable composition including a non-polymerizable resin and a mono-functional functional monomer having a polymerizable unsaturated ethylene double bond, wherein the following relations are satisfied:

$$\Delta Tg = |Tg_p - Tg_m| \geq 19 \text{ degrees C.},$$

where $Tg_p$ represents a glass transition temperature of the non-polymerizable resin and $Tg_m$ represents a glass transition temperature of a homopolymer of the mono-functional monomer, $$Tg_H \geq 10 \text{ degrees C.},$$

where $Tg_H$ represents the higher of $Tg_p$ and $Tg_m$, and $$Tg_L \leq 40 \text{ degrees C.},$$

where $Tg_L$ represents the lower of $Tg_p$ and $Tg_m$.

2. The active energy ray curable composition according to 1 mentioned above, wherein the following relations are furthermore satisfied:

$$Tg_p \geq 10 \text{ degrees C. and } Tg_m \leq 40 \text{ degrees C.}$$

3. The active energy ray curable composition according to 1 or 2 mentioned above, wherein the following relations are furthermore satisfied:

$$Tg_p \geq 10 \text{ degrees C. and } Tg_m \leq 20 \text{ degrees C.}$$

4. The active energy ray curable composition according to any one of 1 to 3 mentioned above, wherein the non-polymerizable resin is an acylic-based resin, an epoxy-based resin, a ketone-based resin, a nitrocellulose-based resin, a phenoxy-based resin, a polyester-based resin, a polyurethane-based resin, a polyvinyl chloride-based resin, or a mixture thereof.

5. The active energy ray curable composition according to any one of 1 to 4 mentioned above, further including a multi-functional monomer having at least two polymerizable unsaturated ethylene bonds accounting for 15 percent by mass or less of the total amount of the polymerizable compounds.

6. The active energy ray curable composition according to any one of 1 to 5 mentioned above, further including an oligomer having a polymerizable unsaturated ethylene bond accounting for 10 percent by mass or less of the total amount of polymerizable compounds.

7. The active energy ray curable composition according to any one of 1 to 6 mentioned above, wherein the active energy ray curable composition is used for additive manufacturing.

8. An active energy ray curable ink including the active energy ray curable composition of any one of 1 to 7 mentioned above.

9. The active energy ray curable ink according to 8 mentioned above, wherein the active energy ray curable ink is used for inkjet.

10. A composition stored container including the active energy ray curable composition of any one of 1 to 7 mentioned above.

11. A two dimensional or three dimensional image forming apparatus including the container including the active energy ray curable composition of any one of 1 to 7 mentioned above, and an irradiator to emit an active energy ray.

12. An image forming method including irradiating the active energy ray curable composition of any one of 1 to 7 mentioned above with an active energy ray.

13. A cured material formed by curing the active energy ray curable composition of any one of 1 to 7 mentioned above.

14. A processed product manufactured by processing the cured material of 13 mentioned above.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present invention is described in detail with reference to Examples and Comparative Examples but not limited thereto.

Manufacturing of Non-polymerizable Resin

Resin A: Polyester-based Resin (Tg: 40 Degrees C.)

The following components were placed in a container equipped with a condenser, a stirrer and a nitrogen introducing tube to conduct reaction at 220 degrees C. for 5 hours while distilling away water produced in a nitrogen atmosphere in such a manner that Tg became 40 degrees C.

Adduct of bisphenol A with 2 moles of propyleneoxide: 450 parts

Adduct of bisphenol A with 3 moles of propylene oxide: 280 parts

Terephthalic acid: 257 parts

Isophthalic acid: 65 parts

Maleic anhydride: 10 parts

Titanium dihydroxybis (triethanol aminate) as condensation catalyst: 2 parts Thereafter, reaction is conducted under a reduced pressure of from 5 mmHg to 20 mmHg followed by cooling down to room temperature and pulverization to obtain Resin A.

Resin B: Epoxy Resin (Tg:10 Degrees C.)

The following recipe was charged into a separable flask equipped with a stirrer, a thermometer, a nitrogen introducing tube, and a condenser:

Bisphenol A type epoxy resin (EPOMIC® RP140P, manufactured by Mitsui Chemicals, Incorporated): 300 g Bisphenol A: 97 g Xylene: 50 mL Thereafter, the system was heated in a nitrogen atmosphere and 1 mL of 0.65 N sodium hydroxide was added. Thereafter, the system was heated to about 150 degrees C. and in the middle xylene was distilled away under a reduced pressure to conduct reaction at 180 degrees C. for five hours in such a manner that Tg became 10 degrees C. to obtain Resin B.

The substrate and materials for use in Examples and Comparative Examples are as follows.

Substrate

Polycarbonate film (PC)

Iupilon 100FE2000 (manufactured by Mitsubishi Engineering-Plastics Corporation Masking, Thickness: 100 μm)

Material

Mono-functional Monomer

Tetrahydrofurfuryl acrylate: THFA (manufactured by OSAKA ORGANIC CHEMICAL INDUSTRY LTD.)

Phenoxyethyl acrylate: PEA (manufactured by OSAKA ORGANIC CHEMICAL INDUSTRY LTD.)

Isoboronyl acrylate: IBXA (manufactured by OSAKA ORGANIC CHEMICAL INDUSTRY LTD.)

Cyclic trimethylol propane formal monoacrylate: SR531 (manufactured by Sartomer Company)

2-methoxyethylacrylate: 2-MTA (manufactured by OSAKA ORGANIC CHEMICAL INDUSTRY LTD.)

Isooctyl acrylate: IOA (manufactured by OSAKA ORGANIC CHEMICAL INDUSTRY LTD.)

3,3,5-trimethylcyclohexane acrylate: CD420, manufactured by Sartomer Company)

Cyclohexyl acrylate: CHA (manufactured by OSAKA ORGANIC CHEMICAL INDUSTRY LTD.)

Non-polymerizable Resin

Resin A: Polyester-based Resin (Tg: 40 Degrees C.)

Resin B: Epoxy Resin (Tg: 10 Degrees C.)

VYLON: GA-1310 (Mn: $20\times10^3$, manufactured by TOYOBO CO., LTD.)

VYLON: GA-443 (Mn: $18\times10^3$, manufactured by TOYOBO CO., LTD.)

VYLON: GA-415 (Mn: $10\times10^3$, manufactured by TOYOBO CO., LTD.)

VYLON: GA-1200 (Mn: $10\times10^3$, manufactured by TOYOBO CO., LTD.)

VYLON: GA-920 (Mn: $30\times10^3$, manufactured by TOYOBO CO., LTD.)

Elvacite 4026, Mw: 32,500 (manufactured by Lucite International, Inc.)

Multi-functional Monomer 1,3-butylene glycol diacrylate: SR212 (manufactured by Sartomer Company)

Trimethylol propane triacrylate (A-TMPT, manufactured by Shin-Nakamura Chemical Co., Ltd.)

Oligomer

Polyester-based Urethane acrylate oligomer : Ultraviolet UV-3010B (manufactured by The Nippon Synthetic Chemical Industry Co., Ltd.)

Weight average molecular weight Mw: 9,690, Number of saturated carbon-carbon bond=2.

Initiator 2,4,6-trimethylbenzoyl-diphenyl-phosphine oxide : LUCIRIN TPO (manufactured by BASF Japan)

1-hydroxy-cyclohexyl-phenyl-ketone : Irgacure 184 (manufactured by BAFS Japan)

2,4-diethylthioxanthon : KAYACURE-DETX-S (manufactured by Nippon Kayaku Co., Ltd.

Pigment

Carbon black

The mixing ratio of carbon black #10 (manufactured by Mitsubishi Chemical Corporation) to the polymer dispersant (S32000, manufactured by Lubrizol Japan Ltd.) was 3:1 by mass.

In the present disclosure, Tg as a characteristics of the monomer-functional monomer represents the glass transition temperature of a cured material of a homopolymer thereof. Tg in the catalog was adopted first and if no catalog value exists, the Tg was measured by DSC method. Polymerization was conducted by a known solution polymerization method.

A: toluene solution of 10 percent monomer
B: Initiator: Azobis isobutyl nitrile: 5 percent After nitrogen purged, A and B were encapsulated.

Shaking for six hours while in hot bath at 60 degrees C.

The resultant was re-precipitated in a solvent in which the monomer was soluble and the polymer was insoluble such as methanol or petroleum ether followed by filtration to be taken out. The filtrated resultant was used for DSC.

In this solution polymerization method, a polymer having a molecular weight from about several tens of thousands to hundreds of thousands was obtained. In such a molecular weight range, the glass transition temperature is not thought to be dependent on the molecular weight so that the glass transition temperature does not change depending on polymerization conditions. The DSC instrument used was Seiko Instruments DSC120U. The range of the measuring temperature was from 30 degrees C. to 300 degrees C. and the temperature rising speed was 2.5 degrees C. per minute.

In the present disclosure, Tg as a characteristics of the non-polymerizable resin was taken from the catalog and if no catalog value existed, the Tg was measured by DSC method. The DSC instrument used was Seiko Instruments DSC120U. The range of the measuring temperature was from 30 degrees C. to 300 degrees C. and the temperature rising speed was 2.5 degrees C. per minute.

Example 1

The materials listed in Table 1 were sequentially added from the top to the bottom of Table 1 while being stirred. After being stirred for one hour and confirmed the remaining of dissolution was few, the resultant was filtered with a membrane filter to remove coarse particles which may cause head clogging to manufacture an ink. This ink was discharged onto a polycarbonate film by an inkjet discharging device having GEN4 heads (manufactured by Ricoh Industry Company, Ltd.) to obtain a layer having a thickness of 10 μm. Immediately after discharging, a curable material was obtained by irradiation of ultraviolet ray having a light amount of 1,500 mJ/cm$^2$ by a UV irradiator (LH6, manufactured by Fusion Systems Japan).

The figures of the monomer, the non-polymerizable resin, the pigment, and the initiator in Table 1 are represented in "parts by mass".

Examples 2 to 23 and Comparative Examples 1 and 8

Inks were manufactured in the same manner as in Example 1 as shown in Tables 1 and 2 followed by printing and curing to obtain a cured material.

Each of the cured materials was measured about jetting characteristics, hardness, extensibility, bending processibility as described below. The results are shown in Tables 1 and 2.

Evaluation Method

Jetting (Discharging) Characteristics

As described above, the ink was discharged onto a polycarbonate film by an inkjet discharging device having GEN4 heads (manufactured by Ricoh Industry Company, Ltd.) to obtain a layer having a thickness of 10 μm. The discharging conditions were:

Head temperature: 60 degrees C.
Discharging voltage (piezo voltage): 7 V
Drive frequency: 1

A: Droplets of jetting was discharged vertically without a satellite droplet
B: Droplets contacted adjacent droplets or satellite droplets observed Hardness Pencil hardness (before extension) was measured according to JIS K5600-5-4 Scratch hardness (pencil method).

The core of a pencil having regulated dimensions, forms, and hardness were pressed against the ink applied surface and moved. The resultant marks or other deficiencies are used to evaluate the resistance of the formed film. The deficiencies of the surface of the formed film caused by the core of a pencil includes the following: The deficiencies are defined as follows:

(a): Plastic deformation: Dimple permanently formed on formed film with causing no agglomeration destruction
(b): Agglomeration destruction: scratches or destruction where the material of the formed layer are removed are visually confirmed on the surface.
(c): Combination of (a) and (b): All the deficiencies may occur at the final stage simultaneously.

The product or the application article to be tested were applied to a flat plate having a uniform surface with a uniform thickness. After drying/reaction curing, the pencil hardness was measured by pressing a pencil to a horizontal layer-formed surface while gradually increasing the hardness thereof. The pencil was mounted in such a manner that during the test, the pencil was pressed to the surface with an angle of 45 degrees and a load of 750 g. The hardness of the pencil was gradually increased until marks or spots were formed on the formed layer due to the deficiencies described in (a), (b), and (c).

Device and Instrument

Pencil scratch hardness TQC WWW tester (specialized for load of 750 g) (manufactured by COTEC Corporation)

Pencil: Set of pencils (Mitsubishi UNI) made of wood for drawing having the next hardness 6B, 5B, 4B, 3B, 2B, B, HB, F, H, 2H, 3H, 4H, 5H, and 6H Pencil sharpener: Special device that scrapes off only the wood part of a pencil while leaving the cylinder-like core of the pencil as was.

Polishing paper: 3M-P 1000

Sequence

Using a pencil sharpener, the wood portion of the sharpener is carefully removed in such a manner that the core of the pencil takes a smooth cylinder-like form free of scratches and 5 mm to 6 mm of the core is exposed.

Holding the pencil vertically, the core is made to contact the polishing paper and move back and forth while keeping the angle of 90 degrees to make the point of the core flat. This is continued until the corner portion of the core has a smooth and circular cross section with no fragment or chipping. This is repeated every time a pencil is used.

The applied film is placed on a flat and solid horizontal surface. The pencil is mounted at a position by a stopper where the testing device is horizontal when the point of the pencil contacts an applied film.

Immediately after the point of the pencil is on the applied film, the instrument is pushed away from the operator at least 7 mm at 0.5 mm/s to 1 mm/s.

The applied film is visually checked to identify the level of the marks defined in (a), (b), and (c).

At this point, if the powder of the core of the pencil of the applied surface is wiped off by a soft cloth or dry cotton and an inactive solvent, this makes destruction evaluation easy. During this test, it has to be careful to avoid an impact on the hardness of the tested portion.

When no mark is made, the test is repeated by increasing the hardness scale until a mark having a length of 3 mm or longer occurs to the test portion while avoiding the test portion already pressed.

When a mark is made, the test is repeated by lowering the hardness scale until no mark is made. The level of the deficiency is determined according to the definition of (a), (b), and (c).

The hardness of the hardest pencil free of a mark is referred to as pencil hardness.

The test is made twice and if the two results are different one or more levels apart from each other, the test is repeated.

Level Determination
A: Pencil hardness HB or higher
B: Pencil hardness B or 2B
C: Pencil hardness 2B or lower Extensibility Breaking elongation at 180 degrees C. was obtained by tension test and the following relation:

Tension tester: AUTOGRAPH AGS-5kNX (manufactured by Shimadzu Corporation)
Tension speed: 20 mm/min
Temperature: 180 degrees C.
Sample: JIS K6251 dumbbell-like form (No. 6)

(Length after tension test−length before tension test)/
(Length before tension test)×100

Level Determination
A: 100% or more
B: 50 percent or more to less than 100 percent
C: Less than 50 percent Bending Property A cured material manufactured in the conditions described above was cut to 10 mm×50 mm and folded and bent by a bending tester having a core mandrel of 2 mm. The bending property was evaluated by cracking occurring to the cured material.

Level Determination
A: Nothing wrong (no cracking)
B: one or two cracking
C: three to ten cracking
D: ten or more thin cracking
E: ten or more thick cracking

TABLE 1

|  |  |  |  | Tg (degrees C.) | Example 1 | Example 2 | Example 3 | Example 4 |
|---|---|---|---|---|---|---|---|---|
| Mixing | Monomer | Monofunctional | THFA | −12 |  |  | 100 | 100 |
|  |  |  | PEA | −22 |  |  |  |  |
|  |  |  | IBXA | 97 | 100 |  |  |  |
|  |  |  | SR531 | 32 |  | 100 |  |  |
|  |  |  | 2-MTA | −50 |  |  |  |  |
|  |  |  | IOA | −58 |  |  |  |  |
|  |  |  | CD420 | 29 |  |  |  |  |
|  |  |  | CHA | 15 |  |  |  |  |
|  |  | Multifunctional | SR-212 | Bi-functional |  |  |  |  |
|  |  |  | A-TMPT | Tri-functional |  |  |  |  |
|  |  | Oligomer | UV3010B |  |  |  |  |  |
|  | Non-polymerizable resin |  | Resin A | 40 | 1.2 |  |  |  |
|  |  |  | Resin B | 10 |  |  |  |  |
|  |  |  | GA-1310 | 27 |  |  | 1.2 |  |
|  |  |  | GA-443 | 14 |  |  |  | 1.2 |
|  |  |  | GA-415 | −8 |  |  |  |  |
|  |  |  | GA-1200 | 0 |  |  |  |  |
|  |  |  | GM-920 | −60 |  |  |  |  |
|  |  |  | Elvacite 4026 | 75 |  | 1.2 |  |  |
|  | Initiator |  | LUCIRIN TPO | — | 5 | 5 | 5 | 5 |
|  |  |  | Irgacure 184 | — | 7.5 | 7.5 | 7.5 | 7.5 |
|  |  |  | DETX |  | 2 | 2 | 2 | 2 |
|  | Pigment |  | Carbon Black | — |  |  |  |  |
| Evaluation | Jetting Characteristics |  |  | — | A | A | A | A |
|  | \|Tgp − Tgm} | degrees C. |  |  | 57 | 43 | 39 | 26 |
|  | Hardness |  |  | — | A | A | A | A |
|  | Extensibility |  |  | — | A | A | A | A |
|  | Bending property |  |  |  | B | C | A | A |

TABLE 1-continued

| | | | | Tg (degrees C.) | Example 5 | Example 6 | Example 7 | Example 8 |
|---|---|---|---|---|---|---|---|---|
| Mixing | Monomer | Mono-functional | THFA | −12 | | | | |
| | | | PEA | −22 | | | 100 | |
| | | | IBXA | 97 | 100 | 100 | | |
| | | | SR531 | 32 | | | | 50 |
| | | | 2-MTA | −50 | | | | 50 |
| | | | IOA | −58 | | | | |
| | | | CD420 | 29 | | | | |
| | | | CHA | 15 | | | | |
| | | Multi-functional | SR-212 | Bi-functional | | | | |
| | | | A-TMPT | Tri-functional | | | | |
| | | Oligomer | UV3010B | | | | | |
| | Non-polymerizable resin | | Resin A | 40 | | | | |
| | | | Resin B | 10 | | | | 1.2 |
| | | | GA-1310 | 27 | | | 1.2 | |
| | | | GA-443 | 14 | | | | |
| | | | GA-415 | −8 | 2 | | | |
| | | | GA-1200 | 0 | | 2 | | |
| | | | GM-920 | −60 | | | | |
| | | | Elvacite 4026 | 75 | | | | |
| | Initiator | | LUCIRIN TPO | — | 5 | 5 | 5 | 5 |
| | | | Irgacure 184 | — | 7.5 | 7.5 | 7.5 | 7.5 |
| | | | DETX | — | 2 | 2 | 2 | 2 |
| | Pigment | | Carbon Black | — | | | | |
| Evaluation | Jetting Characteristics | | | — | A | A | A | A |
| | |Tgp − Tgm| | degrees C. | | — | 105 | 97 | 49 | 19 |
| | Hardness | | | — | A | A | A | A |
| | Extensibility | | | — | A | A | A | A |
| | Bending property | | | | A | A | A | A |

| | | | | Tg (degrees C.) | Example 9 | Example 10 | Example 11 | Example 12 |
|---|---|---|---|---|---|---|---|---|
| Mixing | Monomer | Mono-functional | THFA | −12 | 100 | | | |
| | | | PEA | −22 | | 85 | 85 | 85 |
| | | | IBXA | 97 | | | | |
| | | | SR531 | 32 | | | | |
| | | | 2-MTA | −50 | | | | |
| | | | IOA | −58 | | | | |
| | | | CD420 | 29 | | | | |
| | | | CHA | 15 | | | | |
| | | Multi-functional | SR-212 | Bi-functional | | 15 | 5 | |
| | | | A-TMPT | Tri-functional | | | | 5 |
| | | Oligomer | UV3010B | | | | 10 | 10 |
| | Non-polymerizable resin | | Resin A | 40 | | | | |
| | | | Resin B | 10 | | | | |
| | | | GA-1310 | 27 | 0.6 | | | |
| | | | GA-443 | 14 | 0.6 | 1.2 | 1.2 | 1.2 |
| | | | GA-415 | −8 | | | | |
| | | | GA-1200 | 0 | | | | |
| | | | GM-920 | −60 | | | | |
| | | | Elvacite 4026 | 75 | | | | |
| | Initiator | | LUCIRIN TPO | — | 5 | 5 | 5 | 5 |
| | | | Irgacure 184 | — | 7.5 | 7.5 | 7.5 | 7.5 |
| | | | DETX | — | 2 | 2 | 2 | 2 |
| | Pigment | | Carbon Black | — | | | | |
| Evaluation | Jetting Characteristics | | | — | A | A | A | A |
| | |Tgp − Tgm| | degrees C. | | — | 33 | 36 | 36 | 36 |
| | Hardness | | | — | A | A | A | A |
| | Extensibility | | | — | A | A | A | B |
| | Bending property | | | | A | A | A | A |

TABLE 1-continued

|  |  |  |  | Tg (degrees C.) | Example 13 | Example 14 | Example 15 | Example 16 |
|---|---|---|---|---|---|---|---|---|
| Mixing | Monomer | Mono-functional | THFA | −12 | 50 | 100 |  |  |
|  |  |  | PEA | −22 | 50 |  | 80 | 80 |
|  |  |  | IBXA | 97 |  |  |  |  |
|  |  |  | SR531 | 32 |  |  |  |  |
|  |  |  | 2-MTA | −50 |  |  |  |  |
|  |  |  | IOA | −58 |  |  |  |  |
|  |  |  | CD420 | 29 |  |  |  |  |
|  |  |  | CHA | 15 |  |  |  |  |
|  |  | Multi-functional | SR-212 | Bi-functional |  |  | 20 | 5 |
|  |  |  | A-TMPT | Tri-functional |  |  |  |  |
|  |  | Oligomer | UV3010B |  |  |  |  | 15 |
|  | Non-polymerizable resin |  | Resin A | 40 |  |  |  |  |
|  |  |  | Resin B | 10 |  |  |  |  |
|  |  |  | GA-1310 | 27 |  |  |  |  |
|  |  |  | GA-443 | 14 | 1.2 | 1.2 | 1.2 | 1.2 |
|  |  |  | GA-415 | −8 |  |  |  |  |
|  |  |  | GA-1200 | 0 |  |  |  |  |
|  |  |  | GM-920 | −60 |  |  |  |  |
|  |  |  | Elvacite 4026 | 75 |  |  |  |  |
|  | Initiator |  | LUCIRIN TPO | — | 5 | 5 | 5 | 5 |
|  |  |  | Irgacure 184 | — | 7.5 | 7.5 | 7.5 | 7.5 |
|  |  |  | DETX |  | 2 | 2 | 2 | 2 |
|  | Pigment |  | Carbon Black | — |  | 5 |  |  |
| Evaluation | Jetting Characteristics |  |  | — | A | A | A | A |
|  | \|Tgp − Tgm\| | degrees C. |  | — | 31 | 26 | 36 | 36 |
|  | Hardness |  |  | — | — | A | A | B |
|  | Extensibility |  |  | — | — | A | A | B | B |
|  | Bending property |  |  |  | A | A | B | A |

|  |  |  |  | Tg (degrees C.) | Example 17 | Example 18 | Example 19 | Example 20 |
|---|---|---|---|---|---|---|---|---|
| Mixing | Monomer | Mono-functional | THFA | −12 |  |  |  |  |
|  |  |  | PEA | −22 |  |  |  |  |
|  |  |  | IBXA | 97 | 100 |  |  |  |
|  |  |  | SR531 | 32 |  |  |  |  |
|  |  |  | 2-MTA | −50 |  |  |  |  |
|  |  |  | IOA | −58 |  |  | 100 |  |
|  |  |  | CD420 | 29 |  |  |  | 100 |
|  |  |  | CHA | 15 |  | 100 |  |  |
|  |  | Multi-functional | SR-212 | Bi-functional |  |  |  |  |
|  |  |  | A-TMPT | Tri-functional |  |  |  |  |
|  |  | Oligomer | UV3010B |  |  |  |  |  |
|  | Non-polymerizable resin |  | Resin A | 40 |  |  |  |  |
|  |  |  | Resin B | 10 |  |  |  |  |
|  |  |  | GA-1310 | 27 |  |  |  |  |
|  |  |  | GA-443 | 14 | 1.2 |  | 1.2 |  |
|  |  |  | GA-415 | −8 |  |  |  |  |
|  |  |  | GA-1200 | 0 |  |  |  | 2 |
|  |  |  | GM-920 | −60 |  |  |  |  |
|  |  |  | Elvacite 4026 | 75 |  | 2.5 |  |  |
|  | Initiator |  | LUCIRIN TPO | — | 5 | 5 | 5 | 5 |
|  |  |  | Irgacure 184 | — | 7.5 | 7.5 | 7.5 | 7.5 |
|  |  |  | DETX |  | 2 | 2 | 2 | 2 |
|  | Pigment |  | Carbon Black | — |  |  |  |  |
| Evaluation | Jetting Characteristics |  |  | — | A | A | A | A |
|  | \|Tgp − Tgm\| | degrees C. |  | — | 83 | 60 | 72 | 29 |
|  | Hardness |  |  | — | A | A | A | A |
|  | Extensibility |  |  | — | A | A | A | A |
|  | Bending property |  |  |  | A | A | A | A |

TABLE 1-continued

| | | | | Tg (degrees C.) | Example 21 | Example 22 | Example 23 |
|---|---|---|---|---|---|---|---|
| Mixing | Monomer | Mono-functional | THFA | −12 | | | |
| | | | PEA | −22 | | | |
| | | | IBXA | 97 | | | 100 |
| | | | SR531 | 32 | | | |
| | | | 2-MTA | −50 | | | |
| | | | IOA | −58 | 100 | | |
| | | | CD420 | 29 | | 100 | |
| | | | CHA | 15 | | | |
| | | Multi-functional | SR-212 | Bi-functional | | | |
| | | | A-TMPT | Tri-functional | | | |
| | Oligomer | | UV3010B | | | | |
| | Non-polymerizable resin | | Resin A | 40 | | | |
| | | | Resin B | 10 | | | |
| | | | GA-1310 | 27 | | | |
| | | | GA-443 | 14 | | | |
| | | | GA-415 | −8 | | | |
| | | | GA-1200 | 0 | | | |
| | | | GM-920 | −60 | | 2 | 2 |
| | | | Elvacite 4026 | 75 | 2.5 | | |
| | Initiator | | LUCIRIN TPO | — | 5 | 5 | 5 |
| | | | Irgacure 184 | — | 7.5 | 7.5 | 7.5 |
| | | | DETX | — | 2 | 2 | 2 |
| | Pigment | | Carbon Black | — | | | |
| Evaluation | Jetting Characteristics | | | — | A | A | A |
| | \|Tgp − Tgm\| | degrees C. | | — | 133 | 89 | 157 |
| | Hardness | | | — | A | A | A |
| | Extensibility | | | — | A | A | A |
| | Bending property | | | — | A | A | A |

TABLE 2

| | | | | Tg (degrees C.) | Comparative Example 1 | Comparative Example 2 | Comparative Example 3 |
|---|---|---|---|---|---|---|---|
| Mixing | Monomer | Mono-functional | THFA | −12 | 100 | | |
| | | | PEA | −22 | | 100 | |
| | | | IBXA | 97 | | | 100 |
| | | | SR531 | 32 | | | |
| | | | 2-MTA | −50 | | | |
| | | | IOA | −58 | | | |
| | | | CD420 | 29 | | | |
| | | | CHA | 15 | | | |
| | | Multi-functional | SR-212 | Bi-functional | | | |
| | | | A-TMPT | Tri-functional | | | |
| | Oligomer | | UV3010B | | | | |
| | Non-polymerizable resin | | Resin A | 40 | | | |
| | | | Resin B | 10 | | | |
| | | | GA-1310 | 27 | | | |
| | | | GA-443 | 14 | | | |
| | | | GA-415 | −8 | 2 | | |
| | | | GA-1200 | 0 | | 2 | |
| | | | GM-920 | −60 | | | |
| | | | Elvacite 4026 | 75 | | | 2.5 |
| | Initiator | | DAROCURE TPO | — | 5 | 5 | 5 |
| | | | Irgacure 184 | — | 7.5 | 7.5 | 7.5 |
| | | | DETX | — | 2 | 2 | 2 |
| | Pigment | | Carbon Black | — | | | |
| Evaluation | Jetting Characteristics | | | — | A | A | A |
| | \|Tgp − Tgm\| | degrees C. | | — | 4 | 22 | 22 |
| | Hardness | | | — | A | C | A |
| | Extensibility | | | — | A | A | A |
| | Bending property | | | — | D | B | D |

TABLE 2-continued

|  |  |  |  | Tg (degrees C.) | Comparative Example 4 | Comparative Example 5 | Comparative Example 6 |
|---|---|---|---|---|---|---|---|
| Mixing | Monomer | Mono-functional | THFA | −12 |  | 100 |  |
|  |  |  | PEA | −22 |  |  |  |
|  |  |  | IBXA | 97 |  |  |  |
|  |  |  | SR531 | 32 |  |  |  |
|  |  |  | 2-MTA | −50 |  |  |  |
|  |  |  | IOA | −58 |  |  | 100 |
|  |  |  | CD420 | 29 |  |  |  |
|  |  |  | CHA | 15 | 100 |  |  |
|  |  | Multi-functional | SR-212 | Bi-functional |  |  |  |
|  |  |  | A-TMPT | Tri-functional |  |  |  |
|  |  | Oligomer | UV3010B |  |  |  |  |
|  | Non-polymerizable resin |  | Resin A | 40 |  |  |  |
|  |  |  | Resin B | 10 |  |  |  |
|  |  |  | GA-1310 | 27 |  |  |  |
|  |  |  | GA-443 | 14 | 1.2 |  |  |
|  |  |  | GA-415 | −8 |  |  |  |
|  |  |  | GA-1200 | 0 |  |  | 2 |
|  |  |  | GM-920 | −60 |  | 2 |  |
|  |  |  | Elvacite 4026 | 75 |  |  |  |
|  | Initiator |  | DAROCURE TPO | — | 5 | 5 | 5 |
|  |  |  | Irgacure 184 | — | 7.5 | 7.5 | 7.5 |
|  |  |  | DETX | — | 2 | 2 | 2 |
|  | Pigment |  | Carbon Black | — |  |  |  |
| Evaluation | Jetting Characteristics |  |  | — | A | A | A |
|  | |Tgp − Tgm| | degrees C. |  |  | 1 | 48 | 58 |
|  | Hardness |  | — | — | C | C | C |
|  | Extensibility |  | — | — | A | A | A |
|  | Bending property |  | — | — | E | B | B |

|  |  |  |  | Tg (degrees C.) | Comparative Example 7 | Comparative Example 8 |
|---|---|---|---|---|---|---|
| Mixing | Monomer | Mono-functional | THFA | −12 |  |  |
|  |  |  | PEA | −22 |  |  |
|  |  |  | IBXA | 97 |  |  |
|  |  |  | SR531 | 32 |  |  |
|  |  |  | 2-MTA | −50 |  |  |
|  |  |  | IOA | −58 |  |  |
|  |  |  | CD420 | 29 |  | 100 |
|  |  |  | CHA | 15 |  |  |
|  |  | Multi-functional | SR-212 | Bi-functional | 90 |  |
|  |  |  | A-TMPT | Tri-functional |  |  |
|  |  | Oligomer | UV3010B |  | 10 |  |
|  | Non-polymerizable resin |  | Resin A | 40 |  |  |
|  |  |  | Resin B | 10 |  |  |
|  |  |  | GA-1310 | 27 |  |  |
|  |  |  | GA-443 | 14 |  | 1.2 |
|  |  |  | GA-415 | −8 | 2 |  |
|  |  |  | GA-1200 | 0 |  |  |
|  |  |  | GM-920 | −60 |  |  |
|  |  |  | Elvacite 4026 | 75 |  |  |
|  | Initiator |  | DAROCURE TPO | — | 5 | 5 |
|  |  |  | Irgacure 184 | — | 7.5 | 7.5 |
|  |  |  | DETX | — | 2 | 2 |
|  | Pigment |  | Carbon Black | — |  |  |
| Evaluation | Jetting Characteristics |  |  | — | A | A |
|  | |Tgp − Tgm| | degrees C. |  | — | 15 |
|  | Hardness |  | — | — | A | A |
|  | Extensibility |  | — | — | C | A |
|  | Bending property |  | — | — | E | D |

As seen in the results of Examples 1 to 23, when the absolute value of the difference between the glass transition temperature $Tg_p$ of the non-polymerizable resin and the glass transition temperature $Tg_m$ of a homopolymer of the mono-functional monomer having a single polymerizable unsaturated ethylene double bond is 19 degrees C. or higher, $Tg_H \geq 10$ degrees C., where $Tg_H$ represents the higher of $Tg_p$ and $Tg_m$, and $Tg_L \leq 40$ degrees C., where $Tg_L$ represents the lower of $Tg_p$ and $Tg_m$, it is possible to strike a balance among hardness, extensibility, and bending property of the cured material.

According to the present invention, an active energy ray curable composition is provided by which a cured material is obtained striking a balance between high hardness and extensibility while maintaining bending property.

Having now fully described embodiments of the present invention, it will be apparent to one of ordinary skill in the art that many changes and modifications can be made thereto without departing from the spirit and scope of embodiments of the invention as set forth herein.

What is claimed is:

1. An active energy ray curable composition comprising:
    a non-polymerizable resin; and
    polymerizable compounds comprising a mono-functional monomer having a single polymerizable unsaturated ethylene double bond,
    wherein the following relations are satisfied:

$\Delta Tg = |Tg_p - Tg_m| \geq 20$ degrees C., where $Tg_p$ represents a glass transition temperature of the non-polymerizable resin and $Tg_m$ represents a glass transition temperature of a homopolymer of the mono-functional monomer, $Tg_H \geq 20$ degrees C., where $Tg_H$ represents the higher of $Tg_p$ and $Tg_m$, and $Tg_L \leq 0$ degrees C., where $Tg_L$ represents the lower of $Tg_p$ and $Tg_m$.

2. The active energy ray curable composition according to claim 1, wherein the non-polymerizable resin is selected from the group consisting of an acylic-based resin, an epoxy-based resin, a ketone-based resin, a nitrocellulose-based resin, a phenoxy-based resin, a polyester-based resin, a polyurethane-based resin, a polyvinyl chloride-based resin, and a mixture thereof.

3. The active energy ray curable composition according to claim 1, further comprising a multi-functional monomer having at least two polymerizable unsaturated ethylene bonds accounting for 15 percent by mass or less of a total amount of the polymerizable compounds.

4. The active energy ray curable composition according to claim 1, further comprising an oligomer having a polymerizable unsaturated ethylene bond accounting for 10 percent by mass or less of a total amount of polymerizable compounds.

5. The active energy ray curable composition according to claim 1, wherein the active energy ray curable composition is used for additive manufacturing.

6. An active energy ray curable ink comprising:
    the active energy ray curable composition of claim 1.

7. The active energy ray curable ink according to claim 6, wherein the active energy ray curable ink is used for inkjet.

8. A composition stored container comprising:
    the active energy ray curable composition of claim 1.

9. A two dimensional or three dimensional image forming apparatus comprising:
    a storing part comprising the active energy ray curable composition of claim 1; and
    an irradiator to emit an active energy ray.

10. An image forming method comprising:
    irradiating the active energy ray curable composition of claim 1 with an active energy ray.

11. A cured material formed by curing the active energy ray curable composition of claim 1.

12. A processed product formed by processing the cured material of claim 11.

13. The active energy ray curable composition according to claim 1, wherein the mono-functional monomer is at least one selected from the group consisting of phenoxyethyl acrylate, tetrahydrofurfuryl acrylate, isobornyl acrylate, cyclic trimethyl propane formal monoacrylate, 2-methoxyethyl acrylate, isooctyl acrylate, 3,3,5-trimethylcyclohexane acrylate, and cyclohexyl acrylate.

14. The active energy ray curable composition according to claim 1, wherein the mono-functional monomer is at least one selected from the group consisting of tetrahydrofurfuryl acrylate, isobornyl acrylate, cyclic trimethyl propane formal monoacrylate, 2-methoxyethyl acrylate, isooctyl acrylate, 3,3,5-trimethylcyclohexane acrylate, and cyclohexyl acrylate.

15. An active energy ray curable composition comprising:
    a non-polymerizable resin; and
    polymerizable compounds comprising a mono-functional monomer having a single polymerizable unsaturated ethylene double bond,
    wherein the following relations are satisfied:

$\Delta Tg = |Tg_p - Tg_m| \geq 19$ degrees C., where $Tg_p$ represents a glass transition temperature of the non-polymerizable resin and $Tg_m$ represents a glass transition temperature of a homopolymer of the mono-functional monomer, $Tg_H \geq 10$ degrees C., where $Tg_H$ represents the higher of $Tg_p$ and $Tg_m$, and $Tg_L \leq 40$ degrees C., where $Tg_L$ represents the lower of $Tg_p$ and $Tg_m$,
    wherein the mono-functional monomer is at least one selected from the group consisting of tetrahydrofurfuryl acrylate, isobornyl acrylate, cyclic trimethyl propane formal monoacrylate, 2-methoxvethyl acrylate, isooctyl acrylate, 3,3,5-trimethylcyclohexane acrylate, and cyclohexyl acrylate.

16. The active energy ray curable composition according to claim 15, wherein the following relations are satisfied:

$Tg_H \geq 14$ degrees C., where $Tg_H$ represents the higher of $Tg_p$ and $Tg_m$, and $Tg_L \leq 20$ degrees C., where $Tg_L$ represents the lower of $Tg_p$ and $Tg_m$.

17. The active energy ray curable composition according to claim 15, wherein the following relations are satisfied:

$Tg_p \geq 10$ degrees C., and $Tg_m \leq 40$ degrees.

* * * * *